United States Patent
Horne et al.

(10) Patent No.: US 6,505,813 B1
(45) Date of Patent: Jan. 14, 2003

(54) VALVE ASSEMBLIES

(75) Inventors: Timothy P. Horne, Andover, MA (US); Dale S. Tripp, North Andover, MA (US)

(73) Assignee: Watts Investment Company, Wilmington, DE (US)

( * ) Notice: Subject to any disclaimer, the term of this patent is extended or adjusted under 35 U.S.C. 154(b) by 0 days.

(21) Appl. No.: 09/436,781

(22) Filed: Nov. 8, 1999

Related U.S. Application Data

(63) Continuation-in-part of application No. 09/189,658, filed on Nov. 10, 1998, now Pat. No. 6,019,349.

(51) Int. Cl.⁷ .................................................. F16K 5/06
(52) U.S. Cl. ...................................... 251/148; 285/289.1
(58) Field of Search ........................... 251/148, 315.13, 251/315.14; 285/289.1, 289.2, 289.5, 148.13

(56) References Cited

U.S. PATENT DOCUMENTS

| | | | |
|---|---|---|---|
| 654,735 A | 7/1900 | Jordan | |
| 1,072,208 A | 9/1913 | Dahl | |
| 2,148,746 A | 2/1939 | Hampe et al. | |
| 2,722,437 A | 11/1955 | Phillips | 285/72 |
| 3,033,227 A * | 5/1962 | Goldman | 251/148 |
| 3,126,194 A | 3/1964 | Franck | 251/148 |
| 3,182,952 A | 5/1965 | Mortesi | 251/148 |
| 3,357,678 A | 12/1967 | Dyki | 251/148 |
| 3,550,902 A | 12/1970 | Pidgeon et al. | 251/151 |
| 3,874,714 A | 4/1975 | Bebinger | 285/354 |
| 3,879,064 A | 4/1975 | Lagarelli | 285/12 |
| 4,103,865 A | 8/1978 | Nanba et al. | |
| 4,460,157 A | 7/1984 | Marchal | 251/315.13 |
| 4,667,928 A * | 5/1987 | Davatz et al. | 251/315.13 |
| 4,819,692 A | 4/1989 | Olson et al. | 137/614.03 |
| 4,852,917 A | 8/1989 | Viall, Jr. | 285/353 |
| 5,087,085 A | 2/1992 | McGarvey | 285/328 |
| 5,553,831 A | 9/1996 | Ozaki et al. | |
| 5,636,876 A | 6/1997 | Eidsmore | 285/39 |
| 5,894,741 A * | 4/1999 | Durham et al. | 62/525 |

FOREIGN PATENT DOCUMENTS

| | | |
|---|---|---|
| CH | 374254 | 2/1964 |
| GB | 1308471 | 2/1973 |

* cited by examiner

*Primary Examiner*—John Fox
(74) *Attorney, Agent, or Firm*—Fish & Richardson P.C.

(57) ABSTRACT

A valve assembly includes a valve body defining an inlet and an outlet, and a passageway for flow of fluid from the inlet to the outlet. An attachment member is in removable engagement with the valve body at one of the inlet and the outlet. A pipe coupler is releasably secured to the valve body by the attachment member. The pipe coupler is adapted for attachment to a pipe end by sweating. The pipe coupler defines one, two or three inlets and one outlet. The attachment member is threadedly attached to an internal wall or an external wall of the valve body. The valve assembly is, e.g., a ball valve, a check valve, or a gate valve.

3 Claims, 6 Drawing Sheets

VALVE ASSEMBLIES

CROSS-REFERENCES TO RELATED APPLICATIONS

This application is a continuation-in-part of U.S. application Ser. No. 09/189,658, filed Nov. 10, 1998, entitled "Ball Valve Assemblies," now U.S. Pat. No. 6,019,349, which is hereby incorporated by reference.

BACKGROUND OF THE INVENTION

The invention relates to valves for installation in piping.

Valve assemblies are often placed in fluid flow lines by "sweating" (i.e., soldering) the inlet and outlet of the valve assembly to opposed ends of piping. The elevated temperatures associated with sweating can, in some instances, cause thermal damage to plastic seals and other temperature-sensitive valve components within the valve assembly.

SUMMARY OF THE INVENTION

The invention provides a valve assembly that can be quickly and easily installed by sweating, with lower risk of thermal damage to thermally-sensitive valve components. The valve assembly of the invention includes removable tailpieces having thin walls of a relatively high thermal conductivity material, e.g., copper. The removable tailpieces can be disassembled from the valve body subassembly and sweated into place onto opposed pipe ends, with the valve body then reassembled to the tailpieces, typically after the tailpieces have cooled, thereby removing any possibility of thermal damage to the valve components.

In one aspect, the invention features a valve assembly including a valve body defining an inlet and an outlet, and a passageway for flow of fluid from the inlet toward the outlet; an attachment member in removable engagement with the valve body at one of the inlet and the outlet; and a pipe coupler releasably secured to the valve body by the attachment member. The pipe coupler is adapted for attachment to a pipe end by sweating.

Embodiments of this aspect can include one or more of the following features. The pipe coupler is formed of metal and have a wall thickness between about 0.040 to about 0.070 inch. The pipe coupler defines one inlet and one outlet, two inlets and one outlet, or three inlets and one outlet.

The attachment member engages an internal wall defining the passageway of the valve body. The internal wall defines threads and the attachment member includes a threaded union nut for threaded engagement with the internal wall. The pipe coupler also engages the internal wall. The attachment member engages an external wall of the valve body. The external wall defines threads and the attachment member includes a threaded union nut for threaded engagement with the external wall.

The valve body has first and second ends defining the inlet and outlet, respectively, and the pipe coupler abuts one of the first and second ends. The valve assembly is a ball valve, a check valve, or a gate valve.

The attachment member is in removable engagement with the vale body at the inlet, and a second attachment member is in removable engagement with the valve body at the outlet, a second pipe coupler is releasably secured to the valve body by the second attachment member, and the second pipe coupler is adapted for attachment to a second pipe end by sweating.

In another aspect, the invention features a valve assembly including a valve body defining an inlet and an outlet, and an internal wall defining a passageway for flow of fluid from the inlet toward the outlet, the internal wall including threaded portions at the inlet and the outlet; a first attachment member in threaded engagement with the valve body at the inlet threaded portion; a second attachment member in threaded engagement with the valve body at the outlet threaded portion; a first pipe coupler releasably secured to the valve body at the inlet by the first attachment member, the first pipe coupler engaging the internal wall and being adapted for attachment to a pipe end by sweating; and a second pipe coupler releasably secured to the valve body at the outlet by the second attachment member, the second pipe coupler engaging the internal wall and being adapted for attachment to a pipe end by sweating.

In another aspect, the invention features a valve assembly including a valve body having a first end defining an inlet, a second end defining an outlet, and an external wall including threaded portions at the inlet and the outlet, the valve body further defining a passageway for flow of fluid from the inlet toward the outlet; a first attachment member in threaded engagement with the valve body at the inlet threaded portion; a second attachment member in threaded engagement with the valve body at the outlet threaded portion; a first pipe coupler releasably secured to the valve body at the inlet by the first attachment member, the first pipe coupler abutting the first end of the valve body and being adapted for attachment to a pipe end by sweating; and a second pipe coupler releasably secured to the valve body at the outlet by the second attachment member, the second pipe coupler abutting the second end of the valve body and being adapted for attachment to a pipe end by sweating.

In another aspect, the invention features a valve assembly including a valve body defining an inlet and an outlet, and a passageway for flow of fluid from the inlet toward the outlet; an attachment member in threaded engagement with the valve body at one of the inlet and the outlet; and a pipe coupler releasably secured to the valve body at the inlet by the attachment member, the pipe coupler being formed of metal and adapted for attachment to a pipe end.

Embodiments of this aspect of the invention can include one or more of the following features. The pipe coupler includes threads for attachment to the pipe end. The pipe coupler includes a flange for attachment to the pipe end. The valve assembly further includes a clamp for attaching the pipe coupler to the pipe end. The pipe coupler includes a circumferential ridge adapted to engage and interlock with a circumferential ridge of the pipe end.

In another aspect, the invention features a method for installing a valve assembly between opposed pipe ends by engaging a first pipe coupler upon a first pipe end; joining the first pipe coupler to the first pipe end in leak-tight relationship by sweating at a predetermined sweating temperature; engaging a second pipe coupler with a second pipe end; joining the second pipe coupler to the second pipe end in leak-tight relationship by sweating at a predetermined sweating temperature; thereafter, placing a valve subassembly between the first pipe coupler and the second pipe coupler, the valve subassembly including a valve body defining an inlet and an outlet and a passageway for flow of fluid from the inlet toward the outlet, a valve element disposed within the valve body for movement between a first position allowing flow of fluid from the inlet toward the outlet and a second position resisting flow of fluid form the inlet toward the outlet, and valve components susceptible to thermal damage at a damage temperature below the predetermined sweating temperature; engaging a first attachment member in leak-tight threaded engagement with the valve body at the inlet in a manner to secure the first pipe coupler to the valve body; and engaging a second attachment member in leak-tight threaded engagement with the valve body at the outlet in a manner to secure the second pipe coupler to the valve body.

Embodiments of this aspect can include one or more of the following features. The pipe couplers are axially inserted into the passageway. The first and second pipe couplers second pipe couplers abut first and second ends, respectively, of the valve subassembly.

In another aspect, the invention features a ball valve assembly that includes (a) a valve body defining an inlet and an outlet, and a passageway for flow of fluid from the inlet to the outlet, (b) a ball valve subassembly including a ball valve element disposed within the passageway for rotational movement between a first position allowing flow of fluid from the inlet toward the outlet and a second position resisting flow of fluid from the inlet toward the outlet, and valve components susceptible to thermal damage at a predetermined temperature below sweating temperature, (c) a first attachment member in removable engagement with the valve body at the inlet and a second attachment member in removable engagement with the valve body at the outlet, (d) a first tailpiece releasably secured to the valve body at the inlet by the first attachment member, and (e) a second tailpiece releasably secured to the valve body at the outlet by the second attachment member, the first tailpiece and the second tailpiece adapted for attachment to opposed pipe ends by sweating.

In preferred embodiments, the first attachment member includes a first union nut removably attached upon the valve body in threaded engagement, and the second attachment member comprises a second union nut removably attached upon the valve body in threaded engagement.

In another aspect, the invention features a method for installing a ball valve assembly between opposed pipe ends. The method includes (a) engaging a first tailpiece upon a first pipe end, (b) joining the first tailpiece to the first pipe end in leak-tight relationship by sweating at a predetermined sweating temperature, (c) engaging a second tailpiece upon a second pipe end generally opposing the first pipe end, (d) joining the second tailpiece to the second pipe end in leak-tight relationship by sweating at a predetermined sweating temperature, (e) thereafter, placing a ball valve subassembly between the first tailpiece and the second tailpiece, the ball valve subassembly including a valve body defining an inlet and an outlet and a passageway for flow of fluid from the inlet to the outlet, a ball valve element disposed within the valve body for rotational movement between a first position allowing flow of fluid from the inlet toward the outlet and a second position resisting flow of fluid from the inlet toward the outlet, and valve components susceptible to thermal damage at a damage temperature below the predetermined sweating temperature, (f) engaging a first attachment member in leak-tight threaded engagement with the valve body at the inlet in a manner to secure the first tailpiece to the valve body, and (g) engaging a second attachment member in threaded engagement with the valve body at the outlet in a manner to secure the second tailpiece to the valve body.

Other features and advantages will be apparent from the following description and from the claims.

BRIEF DESCRIPTION OF THE DRAWINGS

FIGS. 2, 3 and 4 are sequential views, in which FIG. 2 is a side view a valve assembly of the invention with the tailpieces positioned on the opposed ends of piping; FIG. 3 is a similar view of the tailpieces of the valve assembly of the invention positioned on the opposed ends of piping for sweating, with the union nuts drawn back and the valve body removed; and FIG. 4 is a similar view of the valve assembly of the invention reassembled with the tailpieces sweated to the opposed ends of piping.

DESCRIPTION OF THE PREFERRED EMBODIMENTS

Figure 1:
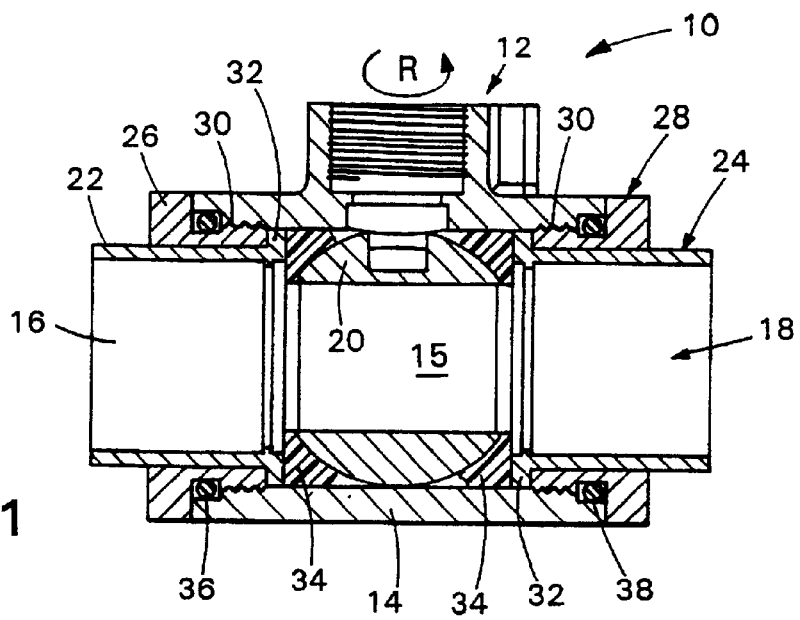
FIG. 1 is a side cross-sectional view of a valve assembly according to one aspect of the invention, with the tailpieces removably mounted to the valve body by union nuts.

Referring to FIG. 1, a valve assembly 10, here a ball valve assembly being shown, includes a valve body 14 defining a passageway 15 for flow of fluid between an inlet 16 and an outlet 18. The ball valve assembly includes a central ball valve subassembly 12 having a ball valve element 20, which can be rotated (arrow, R) between an open position (shown) and a closed position using any suitable means (not shown), e.g. a manually-actuated handle or an electric, pneumatic or hydraulic actuator, all as well known in the art.

To permit valve assembly 10 to be easily sweat into place, without damage to heat-sensitive components, such as plastic seals 34, valve assembly 10 includes a pair of removable pipe couplers, e.g., tailpieces 22, 24. Tailpieces 22, 24 have thin walls, e.g., about 0.040 to about 0.070 inch thick, and are formed of a heat conductive material, e.g., metal, such as steel, copper, or bronze. Typically, tailpieces 22, 24 are formed of high thermal conductive, solderable metal such as copper, to allow them to be quickly brought to sweating temperature. The valve body 14 is formed of metal, typically cast bronze.

Tailpieces 22, 24 are releasably mounted to the valve body 14 by threaded union nuts 26, 28 which engage with threads 30 defined at opposite ends of the valve body 14 in the regions of the inlet and outlet. A pair of seals 36, 38, e.g., o-rings, are mounted between union nuts 26, 28 and valve body 14 to provide a fluid-tight seal. Union nuts 26, 28 engage the shoulders 32 of the corresponding tailpieces 22, 24, which, in turn, bear upon the valve seals 34, urging the valve seals into sealing engagement upon the opposite surfaces of valve element 20.

Figure 2:
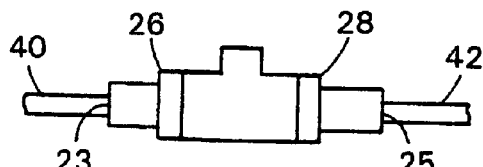
Figure 3:
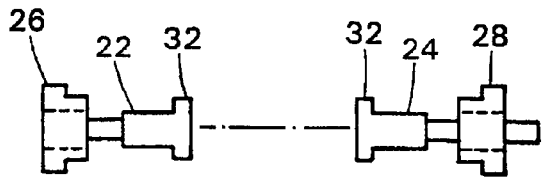
Figure 4:
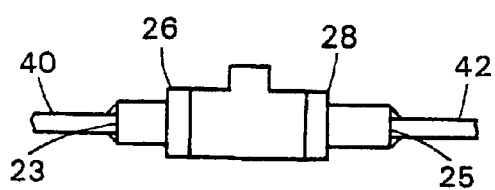

Referring to FIGS. 2–4, a method of the invention for installing valve assembly 10 in a fluid flow line will now be described.

First, valve assembly 10 is partially disassembled by removing union nuts 26, 28 and tailpieces 22, 24. Thus, referring to FIGS. 2 and 3, union nuts 26, 28 are unthreaded from valve body 14 and valve body 14 and tailpieces 22, 24 are removed. The union nuts 26, 28 are then slid onto the respective opposed ends 40, 42 of the piping to positions removed from the ends. The pipe ends 40, 42 are cleaned and engaged within the bores 23, 25 of the respective tailpieces 22, 24, with a soldering flux material in the spaces between the opposed surfaces of the corresponding pipes and bores. The region of the joint is then locally heated to raise the temperature to the level required for sweating, and solder is applied to be drawn as a liquid into the space between the opposed surfaces of the corresponding pipe and bore. The solder then cools and hardens, securing pipe ends 40, 42 within tailpieces 22, 24, and providing a leak-free seal.

Referring finally to FIG. 4, valve assembly 10 is then reassembled by replacing the valve body 14 between the tailpieces 22, 24 and threading union nuts 26, 28 onto valve body 14, with shoulder 32 of each tailpiece engaged by the respective union nut. Tightening of union nuts 26, 28 urges the shoulders 32 of the corresponding tailpieces 22, 24 inwardly, which, in turn, bears upon valve seals 34, to urge the valve seals into sealing engagement upon the surface of valve element 20.

The installation method shown in FIGS. 2–4 and described above requires that there be axial play in the piping, to allow axial movement of the tailpiece faces, first outwardly to allow the valve body to be placed in position, and then inwardly, into the valve passageway, to bear upon the valve seal.

Figure 5:
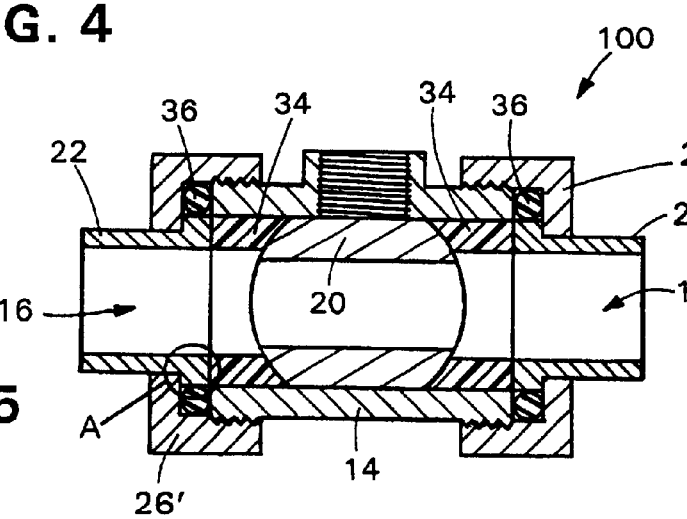
FIG. 5 is a side cross-sectional view of a ball valve assembly according to an alternate aspect of the invention.

Another embodiment of the valve assembly of the invention is especially suited for use, e.g., in environments where there is no axial play in the piping. Referring to FIG. 5, valve assembly 100 is similar to valve assembly 10, discussed above, and the components have been numbered accordingly. However, valve assembly 100 differs in that the union nuts and valve body are constructed so that the union nuts thread onto the outside, rather than the inside, of the valve body. Also, the valve body is sized to fit between the sweated-in-place tailpieces without axial movement of the opposed pipes. Threading union nuts 26', 28' onto valve body 14 presses tailpieces 22, 24 upon the plastic seals 34, resulting in shoulder-to-shoulder contact at region A. This contact results in sealing contact between the plastic seals 34 and the ball element 20.

Figure 6A:
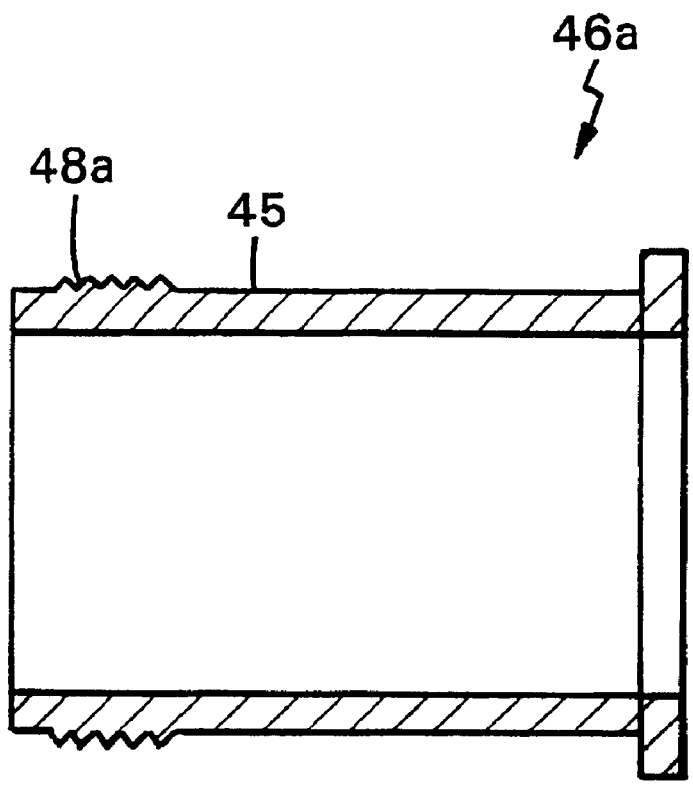
FIGS. 6A–6E are side cross-sectional views of alternative tailpieces useful in securing piping ends to a valve assembly.
Figure 6B:
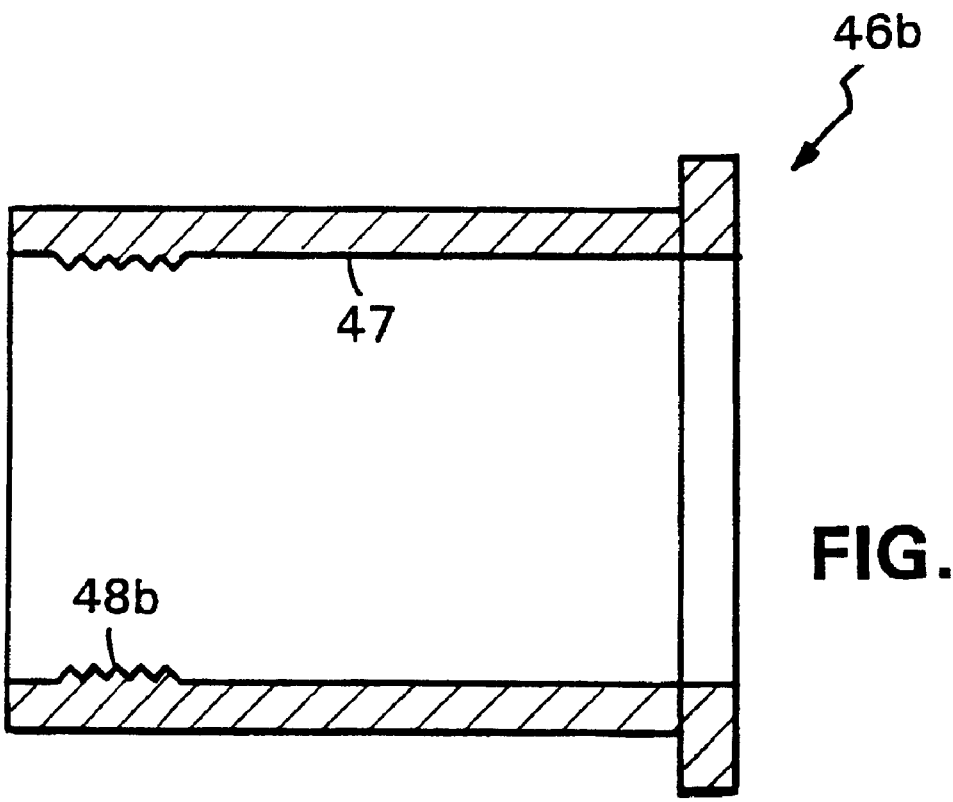
Figure 6C:
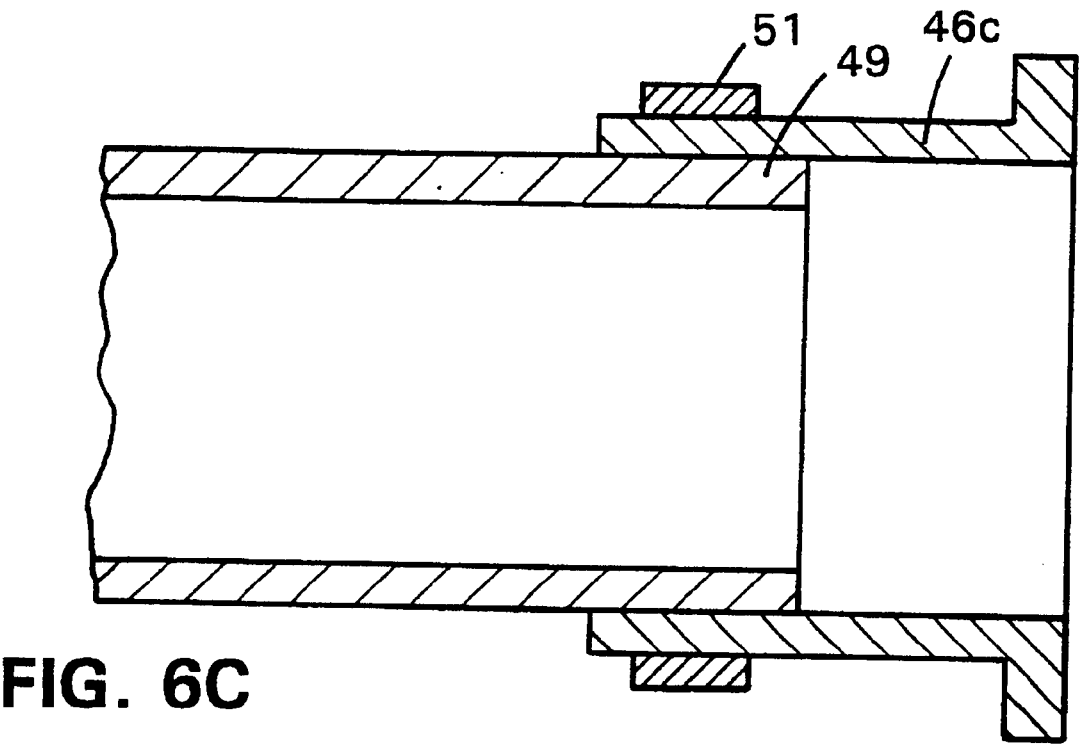
Figure 6D:
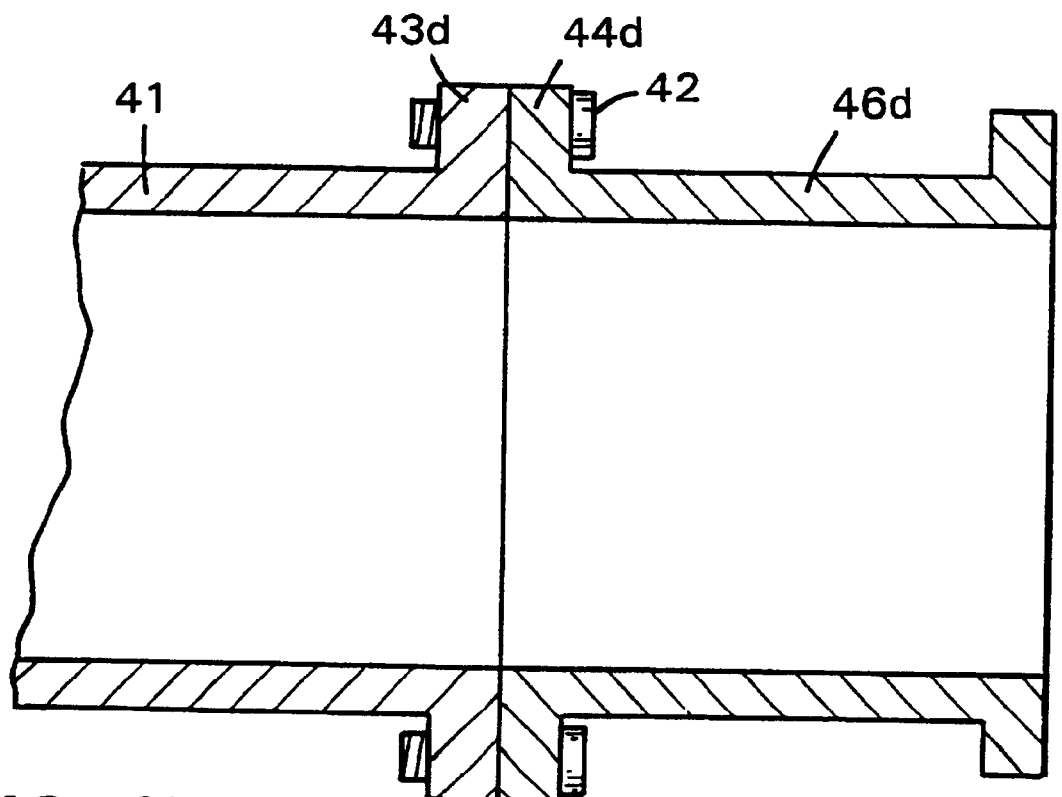
Figure 6E:
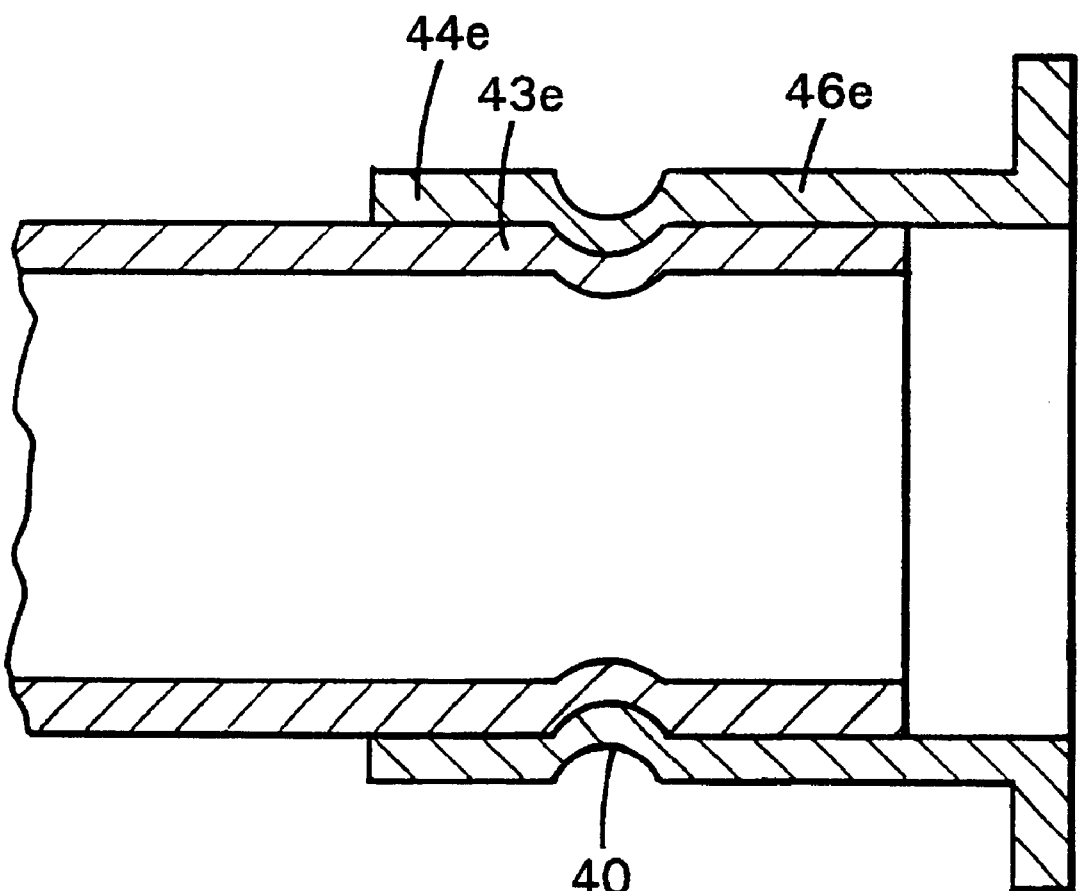

Tailpieces 22, 24 also can be secured to opposing pipe ends by methods other than soldering or welding. Referring to FIGS. 6A and 6B, tailpieces 46a, 46b include threads 48a, 48b on an outer surface 45 or inner surface 47, respectively, of the tailpiece for engaging the piping ends. Referring to FIGS. 6C–6E, in other embodiments, a piping end 49 is secured to tailpiece 46d with a clamp 51 (FIG. 6C); pipe 41 is secured to tailpiece 46d by flanging ends 44d, 43d of tailpiece 46d and pipe 41, respectively, and securing the tailpiece and pipe together, e.g., with bolts 42, (FIG. 6D); or pipe end 44e is secured to tailpiece 46e by crimping to create a circumferential groove 40 (FIG. 6E).

Figure 7A:
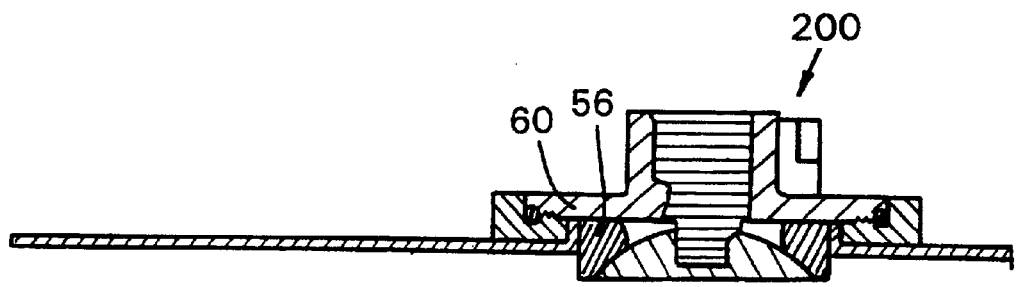
FIG. 7A is a side cross-sectional view of a valve assembly according to another aspect of the invention, with a T-shaped tailpiece removably mounted to the valve body by a union nut.
Figure 7A:
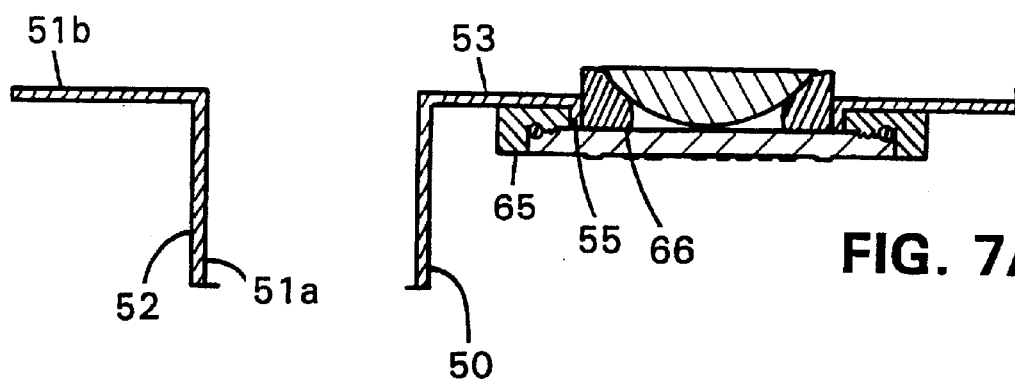
Figure 7B:
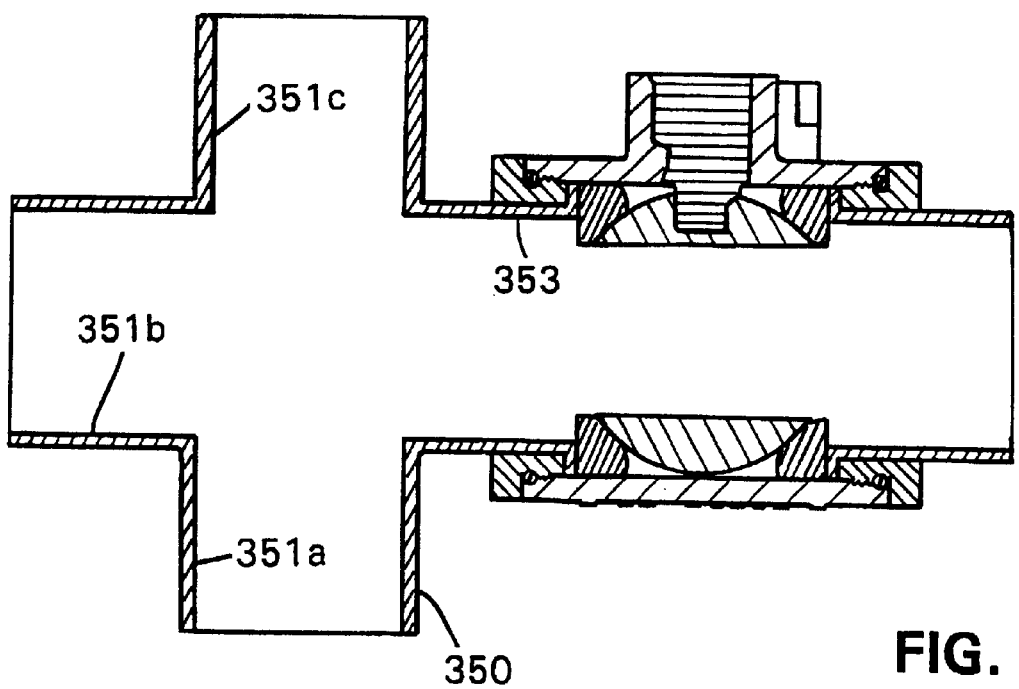
FIG. 7B is a side cross-sectional view of a valve assembly according to another aspect of the invention, with a cross-shaped tailpiece removably mounted to the valve body by a union nut.

Referring to FIG. 7A, a valve assembly 200 includes a tailpiece 50 in the shape of a "T" having two inlets 51a, 51b and one outlet 53. Tailpiece 50 is releasably mounted to a valve body 60 by a threaded union nut 65. Union nut 65 engages a shoulder 55 of tailpiece 50 forcing an outer surface 56 of the tailpiece shoulder to bear onto a valve seal 66. Using "T"-shaped tailpiece 50 eliminates the need to install an external T-shaped pipe near the valve assembly. Alternatively, tailpiece 50 can be rotated 90 with shoulder 55 formed on central branch 52. The tailpiece can also be formed in other shapes, such as y-shaped and cross-shaped-tailpiece 350 in FIG. 7B which has three inlets 351a, 351b, 351c and one outlet 353.

Figure 8A:
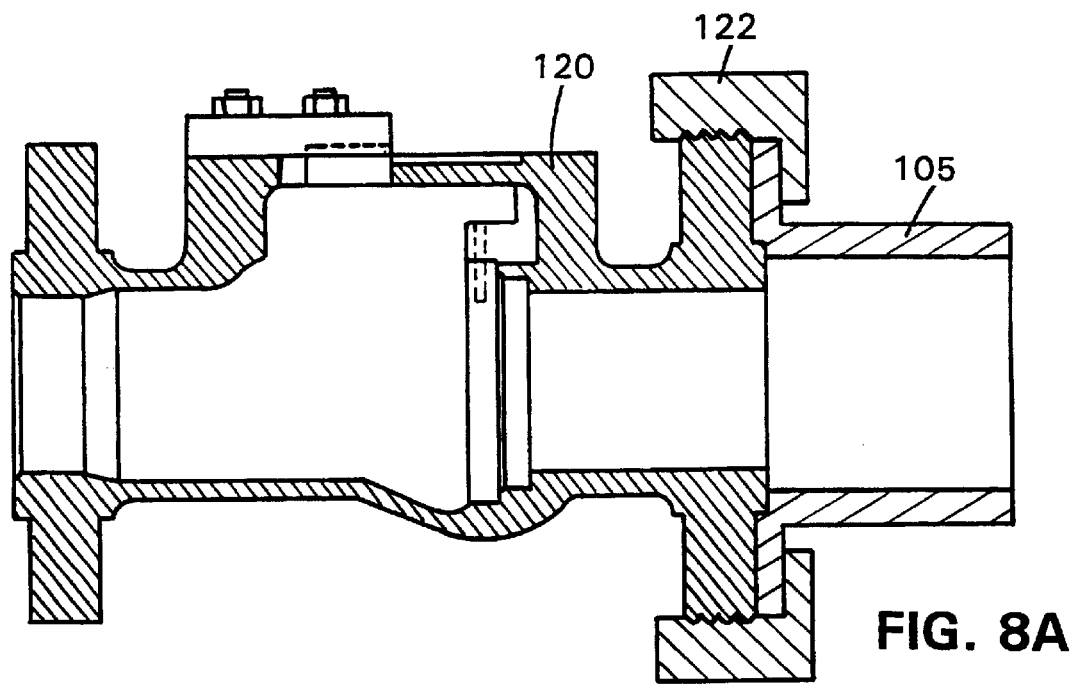
FIGS. 8A and 8B are side cross-sectional views of alternative valve assemblies, each with a tailpiece removably mounted to the valve body by a union nut.
Figure 8B:
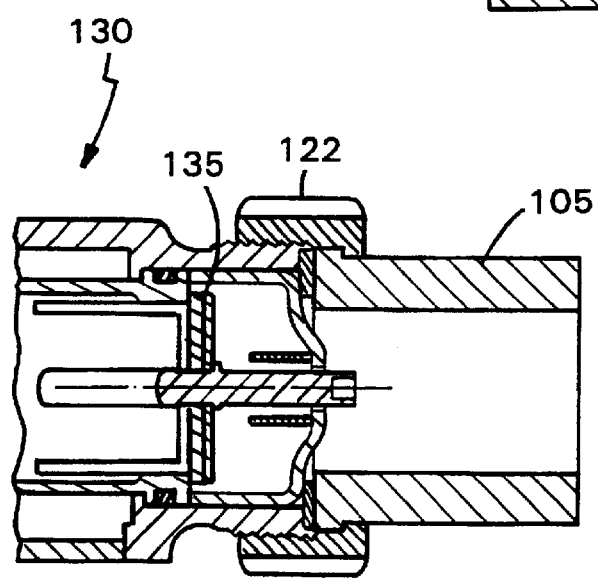

In other embodiments, the disclosed tailpieces can be used to connect piping to valves assemblies other than ball valves, such as, regulator valves, zone control valves, and backflow preventers. For example, referring to FIG. 8A, a tailpiece 105 is shown connected to a gate valve 120 by a union nut 122, and, referring to FIG. 8B, a tailpiece 105 is shown connected to a backflow preventer 130 having a check valve 135 by a union nut 122.

Other embodiments are within the following claims.

What is claimed is:

1. A method for installing a valve assembly between opposed pipe ends, the method comprising the steps of:

engaging a first pipe coupler upon a first pipe end, joining the first pipe coupler to the first pipe end in leak-tight relationship by sweating at a predetermined sweating temperature, engaging a second pipe coupler with a second pipe end, joining the second pipe coupler to the second pipe end in leak-tight relationship by sweating at a predetermined sweating temperature, thereafter, placing a valve subassembly between the first pipe coupler and the second pipe coupler, the valve subassembly including a valve body defining an inlet and an outlet and a passageway for flow of fluid from the inlet toward the outlet, a valve element disposed within the valve body for movement between a first position allowing flow of fluid from the inlet toward the outlet and a second position resisting flow of fluid form the inlet toward the outlet, and valve components susceptible to thermal damage at a damage temperature below the predetermined sweating temperature, engaging a first attachment member in leak-tight threaded engagement with the valve body at the inlet in a manner to secure the first pipe coupler to the valve body, and engaging a second attachment member in leak-tight threaded engagement with the valve body at the outlet in a manner to secure the second pipe coupler to the valve body.

2. The method of claim 1 wherein the pipe couplers are axially inserted into the passageway.

3. The method of claim 1 wherein the first and second pipe couplers abut first and second ends, respectively, of the valve subassembly.

* * * * *